United States Patent [19]

Stanke et al.

[11] 4,135,396
[45] Jan. 23, 1979

[54] TEMPERATURE COMPENSATING FLUID VELOCITY SENSING APPARATUS

[75] Inventors: Dennis A. Stanke, La Crescent, Minn.; Paul C. Rentmeester, La Crosse, Wis.; Paul D. Ulland, La Crescent, Minn.

[73] Assignee: The Trane Company, La Crosse, Wis.

[21] Appl. No.: 899,628

[22] Filed: Apr. 24, 1978

[51] Int. Cl.² ............................................. G01F 1/68
[52] U.S. Cl. .................................................... 73/204
[58] Field of Search ......................................... 73/204

[56] References Cited

U.S. PATENT DOCUMENTS

| | | | |
|---|---|---|---|
| 3,335,606 | 8/1967 | Scarpa | 73/204 |
| 3,623,364 | 11/1971 | Withrow | 73/204 |
| 3,800,592 | 4/1974 | Jones | 73/204 |

*Primary Examiner*—Herbert Goldstein
*Attorney, Agent, or Firm*—Peter D. Ferguson; Carl M. Lewis

[57] ABSTRACT

Apparatus are disclosed for sensing the velocity of a fluid stream, as may be flowing in a duct, pipe, or the like, which fluid stream exhibits variations in its temperature under different operating conditions. The apparatus includes a first probe which is exposed to the fluid stream and includes first temperature sensing means for sensing the temperature of the fluid stream. A second probe is provided which is disposed within the fluid stream and includes at least a portion constructed of a thermally conductive material. Heater means are disposed in thermally conductive relationship with said thermally conductive portion, and second temperature indicative of the temperature of said heater means. Third temperature sensing means are provided for sensing the temperature of the thermally conductive portion of the second probe at a point removed from the heater means, which temperature is a function of the heater means temperature, the fluid temperature, and the velocity of the fluid flowing thereover. In order to compensate for variations in the fluid temperature, heater control circuit means are provided for receiving temperature signals from the first and second temperature sensing means and for controlling the heat output of the heater means so as to maintain substantially constant the temperature difference between the fluid and heater means. Velocity output circuit means are provided for receiving the fluid temperature signal from the first temperature sensing means and the second probe temperature signal from the third temperature sensing means and for producing a signal related to the differences between said temperatures, which signal is related to the velocity of the fluid stream.

13 Claims, 2 Drawing Figures

TEMPERATURE COMPENSATING FLUID VELOCITY SENSING APPARATUS

CROSS REFERENCES TO RELATED APPLICATIONS

The velocity sensing apparatus of this present application has utility in the temperature control disclosed in copending U.S. Patent application Ser. No. 899,627, filed Apr. 4, 1978 entitled, "Temperature Control For Variable Volume Air Conditioning System" by Dennis A. Stanke and Paul C. Rentmeester, which application is commonly assigned with the present application.

BACKGROUND OF THE INVENTION

1. Field of the Invention

The present invention relates generally to fluid velocity sensing apparatus and, more specifically, to such apparatus which include the capability of compensating for variations in fluid temperature over a predetermined operating range. Apparatus of this type find application in many process control situations wherein it is necessary to monitor and sense the velocity or flow rate of a fluid stream, which may be either a liquid or a gas. The invention disclosed herein has been developed as the result of a need for sensing air velocity or flow in order to provide proper control in air conditioning applications.

2. Description of the Prior Art

U.S. Pat. No. 3,623,364 discloses a probe for indicating the flow of fluid which includes a heater element and control circuitry operable to maintain the heater element at a constant, predetermined temperature. A flow sensing temperature measuring device is disposed at an end portion of the probe which is exposed to fluid flow, as well as to the heating effect of the aforementioned heater. The temperature sensed thereby is compared with an "ambient" temperature signal in order to arrive at the appropriate velocity signal. The apparatus disclosed and claimed by applicants differs over the patented system in that the heater means in applicants' second probe means is controlled so as to maintain a constant temperature difference between the heater temperature and the fluid temperature, rather than maintaining a constant heater temperature.

U.S. Pat. No. 3,335,606 also discloses apparatus for sensing the velocity of a fluid stream which includes two thermistors, one of which is disposed within the fluid stream and includes heater means associated therewith, the second of which is exposed only to the temperature of the fluid stream. The thermistors are connected in a wheatstone bridge circuit which, upon becoming imbalanced actuates a heater supply in order to increase the current flowing the aforementioned heater element. The current flowing to the heater element is then measured as an indication of the fluid velocity flowing over the first thermistor.

U.S. Pat. No. 4,028,689 discloses a calorimetric flow monitor which includes first and second thermistors disposed within a fluid flow stream, one of which is heated by a heater element to which a constant current supply is provided. The temperature difference between the respective thermistors is then utilized as an indication of flow rate.

U.S. Pat. No. 3,992,940 discloses a solid-state fluid flow sensor wherein first and second temperature responsive solid-state devices are disposed within a fluid stream, one of which is heated by another solid-state device so as to maintain constant the temperature difference between the aforementioned temperature responsive devices. The current flow to the heater element is monitored as an indicator of fluid velocity.

SUMMARY OF THE INVENTION, OBJECTS

The present invention relates to apparatus for sensing the velocity of a variable temperature fluid stream, which apparatus comprises first probe means including first temperature sensing means for sensing the temperature of the fluid and producing a first signal related thereto. In a preferred embodiment, the first probe means includes an elongated, tubular metal enclosure which is exposed to the fluid stream and includes therein a thermistor as the temperature sensing means.

The apparatus also includes second probe means including at least a portion constructed of thermally conductive material disposed in the fluid stream. The second probe means further includes heater means disposed in thermally conductive relationship with the thermally conductive portion of the second probe means and second temperature sensing means for sensing a temperature indicative of the temperature of the heater means and for producing a second signal related thereto. Also associated with the second probe means are third temperature sensing means for sensing the temperature of the thermally conductive portion of said second probe means at a point removed from said heater means and for producing a third signal related thereto.

Associated with the first and second probe means are heater control circuit means for receiving said first and second signals and for controlling the heat output of said heater means so as to maintain substantially constant the temperature difference between said fluid stream and said heater means. Velocity output circuit means are provided for receiving said first and third signals and for producing a fourth signal related to the difference between the temperature of said fluid and the temperature of said second probe means at said point removed from said heater means, said fourth signal being related to the velocity of said fluid stream.

Since the temperature difference between the heater means and the fluid is maintained substantially constant by the heater control circuit means, the difference in temperature between the fluid and that temperature sensed by the third temperature sensing means is indicative of the fluid velocity flowing past the second probe means and is independent of fluid temperature.

In a preferred embodiment, the heater control circuit means comprise means for combining said first and second signals so as to produce a fifth signal related to the difference in temperature between said fluid and said heater means and comparator means for receiving said fifth signal and comparing same with a reference signal related to a predetermined difference in temperature between said fluid and said heater means, said comparator means being operative to produce an output signal when the difference in temperature between said fluid and said heater means falls below said predetermined difference. Switch means are provided responsive to said output signal for energizing said heater means so as to increase its temperature.

Accordingly, it is an object of the present invention to provide apparatus of the character described for sensing the velocity of a variable temperature fluid stream which provides the necessary compensation so as to accurately sense fluid velocity over a predetermined range of fluid temperatures.

It is a further object of the present invention to provide such apparatus wherein heater means are associated with the second probe means and are controlled so as to maintain substantially constant the temperature difference between the fluid stream and the heater means, thereby compensating for changes in temperature of the fluid stream.

Yet another object of the present invention is to provide apparatus for sensing the velocity of a variable temperature fluid stream which is relatively simple and inexpensive in construction yet which are durable in operation so as to provide high reliability over the operating life of the apparatus.

A further object of the present invention is to provide apparatus as described above wherein the associated heater control circuit means and velocity output circuit means are relatively simple and therefore inexpensive, yet which provide a satisfactory output signal which is related to the velocity of the fluid stream.

These and further objects of the present invention will become apparent from the following description of a preferred embodiment and by reference to the accompanying drawings.

DESCRIPTION OF A PREFERRED EMBODIMENT

Figure 1:
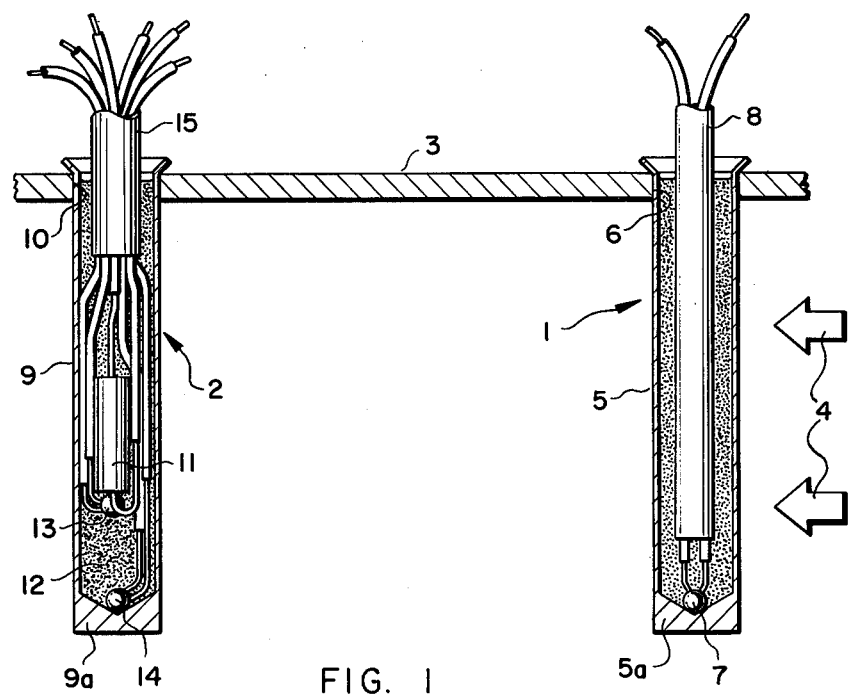
FIG. 1 is a view taken in cross-section of the first and second probe means of the present invention as they might be installed in a fluid flow conduit.

Turning now to FIG. 1 of the drawings, the apparatus of the present invention is illustrated and includes first probe means indicated generally by the reference numeral 1 and second probe means indicated generally by the reference numeral 2. The first and second probe means as shown are disposed within a fluid carrying conduit 3, only one wall portion of which is illustrated, and which has a fluid flowing therethrough in the direction indicated by arrows 4.

First probe means 1 comprises an elongated, tubular metal enclosure 5 having a closed end 5a. The first probe means is inserted into conduit means 3 through an opening 6 and is maintained in sealing engagement therewith through the use of suitable fastening means and/or adhesives. Disposed within tubular enclosure 5 is a first temperature sensing means 7 which, in a preferred embodiment, comprise a negative temperature coefficient thermistor. As shown, thermistor 7 is disposed immediately adjacent closed end 5a so as to accurately sense the temperature of the fluid flowing thereover. Suitable conductor means 8 are attached to thermistor 7 for connection to associated circuit means as will be described hereinafter.

Turning now to second probe means 2, it will be noted that it also includes an elongated, tubular metal enclosure 9 having a closed end 9a. Tubular enclosure 9 is maintained in an opening 10 of conduit means 3 in a manner similar to tubular enclosure 5.

Disposed within tubular enclosure 9 are heater means 11 which are maintained in thermally conductive relationship with the tubular enclosure by way of thermally conductive potting compound 12 which is disposed between heater means 11 and tubular means 9. Second temperature sensing means 13 are disposed immediately adjacent heater means 11 and, in a preferred embodiment, comprise a negative temperature coefficient thermistor.

Also disposed within tubular enclosure 9 are third temperature sensing means 14 which, as shown, are located immediately adjacent closed end 9a thereof and which, in a preferred embodiment, also comprise a negative temperature coefficient thermistor.

As shown, heater means 11, second temperature sensing means 13, and third temperature sensing means 14 are maintained within tubular enclosure 9 by potting compound indicated at 12. As mentioned above, potting compound 12 is thermally conductive such that heater means 11 is in thermally conductive relationship with tubular enclosure 9. It will be appreciated that, since tubular enclosure 9 is constructed of metal, it too is thermally conductive.

Conductor means 15 are provided for second probe means 2 so as to connect heater means 11, thermistor 13, and thermistor 14 to the associated circuit means which will be described hereinafter.

The functions of first and second probe means 1 and 2 in the present apparatus will now be discussed. It will be appreciated that, since first probe means 1 is exposed to the fluid flowing through conduit means 3, that thermistor 7 will accurately sense the temperature of said fluid.

Since second probe means 2 is disposed within the fluid flow stream, the temperature sensed by thermistor 14 will be a function of the temperature of heater means 11, the temperature of the fluid itself, and the velocity of the fluid stream passing thereover. Thus, if the temperature of the fluid stream were to remain constant, an increase in its velocity would result in a decreased temperature at thermistor 14 (assuming a constant heater temperature), and upon a decrease in fluid velocity, its temperature would increase. Since, in practice, it is unlikely that the temperature of the fluid stream will remain constant, and, in some applications will intentionally be varied, some means must be provided to compensate for the effect of fluid temperature upon the temperature sensed by thermistor 14 in order to arrive at an accurate indication of fluid velocity. It is this problem to which applicants' invention is addressed.

Since the temperature driving force affecting the temperature sensed by thermistor 14 is equal to the difference in temperature between heater means 11, as sensed by thermistor 13; and the fluid temperature, as sensed by thermistor 7; it follows that, if this temperature difference is maintained constant over the variations in fluid temperature, that the difference in the temperatures sensed by thermistor 14 and thermistor 7 will be a function solely of fluid velocity.

Having made this discovery, applicants have developed circuit means which will be described immediately below in order to put this discovery into practice.

Figure 2:
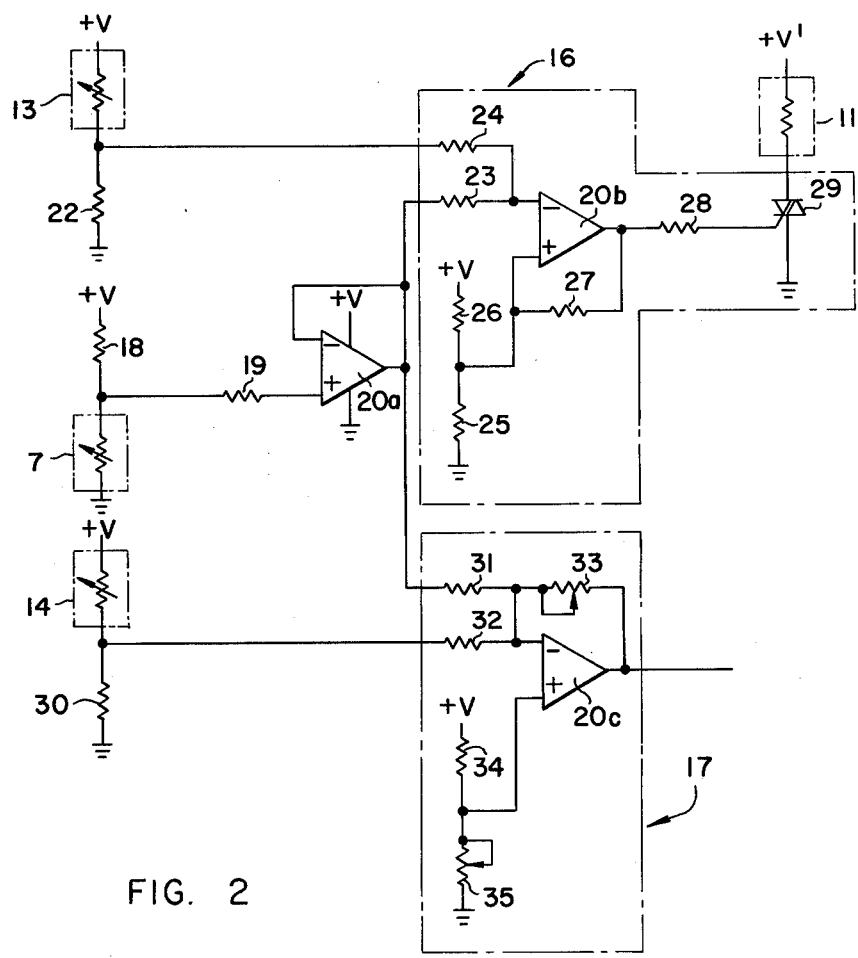
FIG. 2 is a circuit diagram of the control circuitry associated with the present invention.

Turning then to FIG. 2 of the drawings, an electrical circuit is illustrated wherein the symbol +V is utilized to indicate a constant source of DC voltage and wherein the symbol +V' is utilized to indicate a source of AC voltage. Similarly, the customary symbol of "ground" is utilized throughout FIG. 2 to indicate the common, or ground connection.

The circuit of FIG. 2 includes heater control circuit means indicated generally by reference numeral 16 and velocity output circuit means indicated generally by reference numeral 17.

As shown in FIG. 2, thermistor 7 is connected in a voltage divider circuit including resistor 18 such that a first voltage signal is produced therebetween which is inversely proportional to the temperature sensed by thermistor 7, this being so due to the fact that thermistor 7 exhibits a negative temperature coefficient such that an increase in temperature results in a decrease in its resistance. The first voltage signal is then passed to a high impedance input circuit comprising resistor 19 and operational amplifier 20a. This impedance circuit insures that the first voltage signal is not affected by any of the subsequent circuitry to be described hereinafter.

Thermistor 13 is also wired in a voltage divider circuit including resistor 22 such that a second voltage signal is produced at the junction therebetween which is proportional to the sensed temperature, thermistor 13 also exhibiting a negative temperature coefficient.

As is apparent from FIG. 2, the first and second voltage signals are received by heater control circuit means 16 via respective resistors 23 and 24 where they are combined, resulting in a fifth signal related to the difference in temperature between the fluid and the heater means. This fifth signal is fed to a second operational amplifier 20b which is wired so as to operate as comparator means. A reference voltage signal is generated by the voltage divider network comprising resistor 26 and resistor 25 to be input into the other terminal of comparator means 20b. A resistor 27 having a relatively high value is connected between the output terminal of comparator means 20b and the reference voltage signal so as to provide hysteresis for the comparator.

Comparator means 20b compares the fifth voltage signal with the reference voltage signal and produces an output signal when the difference in temperature between the fluid and the heater means falls below a predetermined difference, as established by the reference voltage signal. The output signal from comparator means 20b passes via resistor 28 to switch means 29 which, in a preferred embodiment, comprise a triac. Heater means 11 is connected in series with triac 29 such that, upon the occurrence of an output signal from comparator means 20b, triac 29 is rendered conductive so as to energize heater means 11 by way of voltage source +V'.

It should thus be apparent that heater control circuit means 16 is operative to receive the first and second voltage signals and for controlling the heat output of the heater means so as to maintain substantially constant the temperature difference between the fluid stream and the heater means.

Turning now to velocity output circuit means 17, it is seen that thermistor 14 is included in a voltage divider network including resistor 30 such that a third voltage signal is produced therebetween which is proportional to the temperature sensed by thermistor 14, which also exhibits a negative temperature coefficient. The first voltage signal and third voltage signals are received by velocity output circuit means 17 via resistors 31 and 32, respectively, where they are combined so as to produce a fourth signal related to the difference between the temperature of the fluid and the temperature of the second probe means as sensed by thermistor 14. This fourth signal is fed to one input of operational amplifier 20c, which is wired to operate as an amplifier, the gain of which may be adjusted by variable resistance 33. The other input of operational amplifier 20c is provided with an offset voltage signal produced by the voltage divider network comprising resistor 34 and variable resistance 35. The output signal of operational amplifier 20c is proportional to the fourth signal mentioned previously but amplified and offset with respect thereto; that is, its magnitude is increased and an offset voltage is added thereto.

As discussed above, the fourth signal is related to the difference between the temperature of the fluid and the temperature of the second probe means as sensed by thermistor 13 and is related to the velocity of the fluid stream; specifically, the fourth signal increases in response to increases in velocity. Thus, the fourth voltage signal may be utilized by any desired control apparatus or circuitry so as to effect control functions responsive thereto or, in the alternative, simply to monitor the velocity of the fluid stream using suitable indicating devices.

Appearing immediately below is a table listing the components and specifications thereof which applicants have found suitable for use in the circuit of FIG. 2. It will be appreciated by those skilled in the art, however, that for any specific application of apparatus of the type disclosed, that the circuitry would necessarily be tailored so as to provide optimum results therein.

| Reference Numeral | Item | Manufacturer/Description |
|---|---|---|
| 7 | Thermistor | Fenwall UUA41J1 |
| 13, 14 | Thermistor | Fenwall UUT51J1 |
| 18 | Resistor | 4.3K, ¼W, 5% |
| 19 | Resistor | 10K, ¼W, 5% |
| 22 | Resistor | 2.4K, ¼W, 5% |
| 23 | Resistor | 200K, ¼W, 1% |
| 24 | Resistor | 150K, ¼W, 1% |
| 25 | Resistor | 10.5K, ¼W, 1% |
| 26 | Resistor | 10.0K, ¼W, 1% |
| 27 | Resistor | 2M, ¼W, 5% |
| 28 | Resistor | 0.82K, ¼W, 5% |
| 30 | Resistor | 9.1K, ¼W, 5% |
| 31 | Resistor | 178K, ¼W, 1% |
| 32 | Resistor | 150K, ¼W, 1% |
| 34 | Resistor | 8.2K, ¼W, 5% |
| 35 | Pontentionmeter | 10K, Allen-Bradley E2A103 |
| 33 | Potentionmeter | 1M, Allen-Bradley E2A105 |
| 20a, b, c | Quad Op Amp | National LM 324N |
| 11 | Resistor | 1.5W, 100 Ohm, Ohmite 955-1A |
| 29 | Triac | Motorla 2N6070A |
| +V | Voltage Source | 12 Volt D.C. |
| +V' | Voltage Source | 21-28 Volt A.C. |

Although the present invention has been disclosed with respect to a preferred embodiment, wherein first and second probe means are provided which are physically separate from each other, it is within the scope of the invention that a single, unitary member could be provided having both probe means integral therewith, the only requirement being that suitable insulation means be provided therebetween so as to prevent the second probe means from having an effect on the temperature of the first probe means. Further, it may be desirable that the first probe means be disposed at a location subjected to the fluid temperature but not within the actual flow stream thereof, such as in a reservoir in communication therewith defining a quiescent zone. Also, it is possible that thermistor 7 itself could be located so as to be directly exposed to the fluid rather than enclosed within a tubular member as shown. The illustrated construction is preferred, however, in order to afford protection to thermistor 7 from the fluid flow.

While the invention has been described with respect to a preferred embodiment, it is to be understood that modifications thereto will be apparent to those skilled in the art within the scope of the invention, as defined in the claims which follow.

We claim:

1. Apparatus for sensing the velocity of a variable temperature fluid stream comprising
   a. first probe means including first temperature sensing means for sensing the temperature of said fluid and producing a first signal related thereto;
   b. second probe means including at least a portion constructed of thermally conductive material to be disposed in said fluid stream, said probe means including
      i. heater means disposed in thermally conductive relationship with the thermally conductive portion of said second probe means;
      ii. second temperature sensing means for sensing a temperature indicative of the temperature of said heater means and for producing a second signal related thereto; and
      iii. third temperature sensing means for sensing the temperature of the thermally conductive portion of said second probe means at a point removed from said heater means and for producing a third signal related thereto;
   c. heater control circuit means for receiving said first and second signals and for controlling the heat output of said heater means so as to maintain substantially constant the temperature difference between said fluid stream and said heater means; and
   d. velocity output circuit means for receiving said first and third signals and for producing a fourth signal related to the difference between the temperature of said fluid and the temperature of said second probe means at said point removed from said heater means, said fourth signal being related to the velocity of said fluid stream.

2. The apparatus of claim 1 wherein said first and second probe means each comprise an elongated, tubular metal enclosure.

3. The apparatus of claim 1 wherein said first, second, and third temperature sensing means each comprise a thermistor.

4. The apparatus of claim 1 wherein said second temperature sensing means is disposed immediately adjacent said heater means so as to directly sense its temperature.

5. The apparatus of claim 1 wherein said second probe means comprise an elongated, tubular metal enclosure having a closed end, said heater means being disposed within and in thermally conductive relationship with said enclosure at a point along its length removed from said closed end, and said third temperature sensing means being disposed within said enclosure at a point removed from said heater means adjacent said closed end.

6. The apparatus of claim 5 wherein said second temperature sensing means is disposed within said enclosure at a point immediately adjacent said heater means so as to directly sense its temperature.

7. The apparatus of claim 1 wherein said first probe means comprise an elongated tubular metal enclosure having a closed end, said first temperature sensing means being disposed within said enclosure at a point adjacent said closed end.

8. The apparatus of claims 5, 6, or 7 wherein said first, second, and third temperature sensing means each comprise a thermistor.

9. The apparatus of claim 1 wherein said first probe means include a least a portion constructed of thermally conductive material to be disposed in said fluid stream, said first temperature sensing means being disposed in thermally conductive relationship with said portion so as to sense the temperature of said fluid passing thereover.

10. The apparatus of claim 1 wherein said heater control circuit means include
    a. means for combining said first and second signals so as to produce a fifth signal related to the difference in temperature between said fluid and said heater means;
    b. comparator means for receiving said fifth signal and comparing same with a reference signal related to a predetermined difference in temperature between said fluid and said heater means, said comparator means being operative to produce an output signal when the difference in temperature between said fluid and said heater means falls below said predetermined difference; and
    c. switch means responsive to said output signal for energizing said heater means so as to increase its temperature.

11. The apparatus of claim 1 or 10 wherein said velocity output circuit means comprise means for combining said first and third signals so as to produce said fourth signal related to the difference in temperature between said fluid and said second probe means at said point removed from said heater means, said fourth signal being related to the velocity of said fluid stream.

12. The apparatus of claim 11 wherein said velocity output circuit means further coimprise amplifier means for increasing the amplitude of said fourth signal.

13. The apparatus of claim 11 wherein said first, second, third, and fourth signals comprise voltage signals.

* * * * *